United States Patent [19]

Krishnakumar

[11] Patent Number: 5,158,817
[45] Date of Patent: Oct. 27, 1992

[54] METHOD OF FORMING THE BASE SECTION OF OBLONG OR OVAL CONTAINERS AND A PREFORM FOR EFFECTING SAME

[75] Inventor: Suppayan M. Krishnakumar, Nashua, N.H.

[73] Assignee: Continental Pet Technologies, Inc., Norwalk, Conn.

[21] Appl. No.: 507,766

[22] Filed: Apr. 12, 1990

[51] Int. Cl.⁵ .................... B65D 25/00; B29C 49/08
[52] U.S. Cl. .............................. 428/36.92; 428/542.8; 215/1 C
[58] Field of Search ............ 428/36.92, 542.8; 215/1 C; 264/532, 535

[56] References Cited

U.S. PATENT DOCUMENTS 4,927,680  5/1990  Collette ............................ 428/36.92

*Primary Examiner*—Ellis P. Robinson
*Assistant Examiner*—Rena L. Dye
*Attorney, Agent, or Firm*—Therese A. Hendricks

[57] ABSTRACT

This relates to the stretch blow molding of a generally rectangular container specifically of an oval or oblong cross section. Customarily, stretch blow molded containers are formed from preforms which generally have a substantially cylindrical body which terminates in a hemispherical end. However, it has been found that in the stretch blow molding of a container of an oval or oblong section, because the sides are much wider than the ends, there is an uneven stretching and distribution of the material of the preform. This particularly relates to a preform having a modified container base forming portion which is of a reduced wall thickness and which includes an intermediate frusto conical part. By so shaping the base forming portion of the preform, correct amounts of material are provided for forming the base construction of a container.

5 Claims, 3 Drawing Sheets

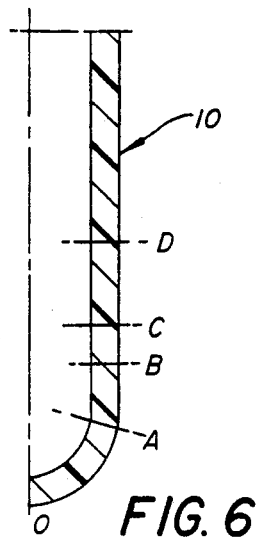
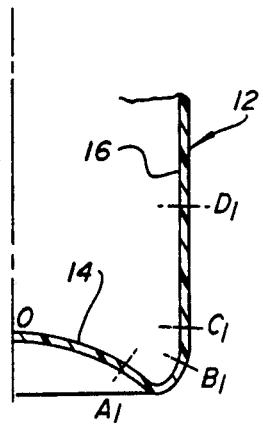
FIG. 6
PRIOR ART
FIG. 8
PRIOR ART
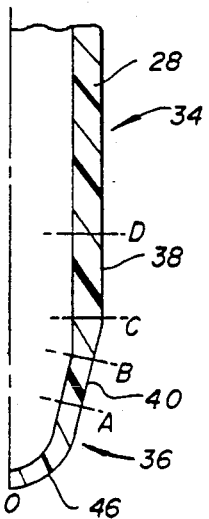
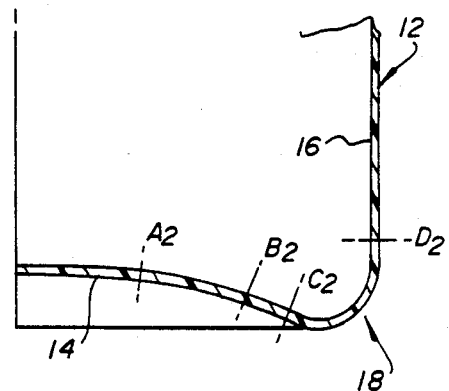
FIG. 7
PRIOR ART
FIG. 10
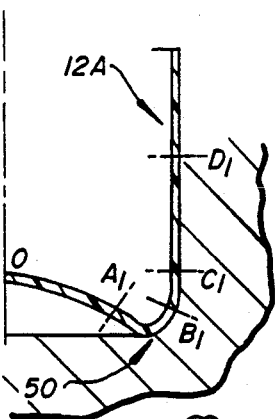
FIG. 12
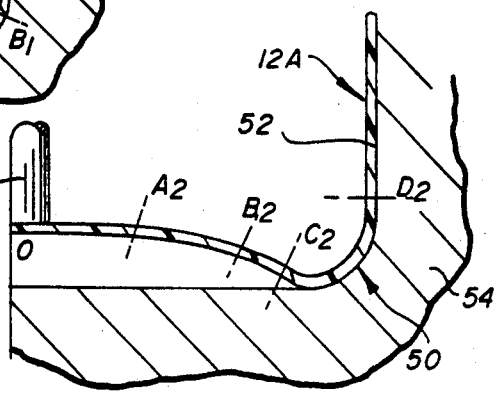
FIG. 11

METHOD OF FORMING THE BASE SECTION OF OBLONG OR OVAL CONTAINERS AND A PREFORM FOR EFFECTING SAME

This invention relates in general to new and useful improvements in stretch blow molded containers formed from injection molded performs, and more particularly to the formation of containers having a base section of oblong or oval cross section.

BACKGROUND OF THE INVENTION

Generally in containers with oblong or oval cross section, the shape of the seating surface of the base of such containers is also oblong or oval. This is primarily true in containers with an a/b ratio in the range of 1.5 to 3.0 where $2a$ is the major width and $2b$ is the minor width of the container. In such containers, to improve the standing stability of the containers in which the minor width $2b$ is small compared to its height, the container is formed with a base corner radius $R_b$ at the minor axis which is smaller than that of the radius of $R_a$ at the major axis. This is shown in the prior art showing of FIG. 1.

SUMMARY

As will be described in more detail, due to the differences in the radial distances and due to the oblong or oval cross section of the blow mold cavity, the wall thickness reduction ratio in one part is much greater than that in another part. It has been found that when a conventional preform with constant wall thickness and hemispherical closed end is used, the wall thickness in the second part will be much greater than that in the first part. The excess material leads to problems such as partially formed sections, loss of shape due to post mold shrinkage and a non-flat or planar seating surface as well as lower impact strength. At the other extreme, the lack of material in some parts could lead to stress whitening, pin holes, partially formed corner, lower impact strength and non-flat or planar seating surfaces. In accordance with this invention, there has been provided an improved preform which will eliminate the above set forth deficiencies. This invention specifically relates to such preform and the method of utilizing the preform in the stretch blow molding of an oval or oblong container therefrom in a conventional blow mold.

With the above and other objects in view that will hereinafter appear, the nature of the invention will be more clearly understood by reference to the following detailed description, the appended claims, and the several view illustrated in the accompanying drawings.

IN THE DRAWINGS

FIG. 6 is a schematic vertical sectional view of the lower part of the preform of FIG. 5 with markings to indicate distribution.

FIG. 7 is a longitudinal schematic vertical sectional view through the container formed from the preform of FIG. 6.

FIG. 8 is a transverse schematic vertical sectional view taken through the same container formed from the preform of FIG. 6.

FIG. 10 is a schematic sectional view of the lower part of the preform of FIG. 9 with area identifying markings thereon.

FIG. 11 is a schematic longitudinal vertical sectional view of the lower part of a container such as the container of FIG. 1 formed from the preform of FIG. 10 and shows the same in an associated blow mold.

FIG. 12 is a transverse schematic vertical sectional view of the lower portion of the container of FIG. 11 and relates the same to the portions of the preform of FIG. 10 from which it is formed.

SHORT DESCRIPTION OF THE DRAWINGS

Figure 1:
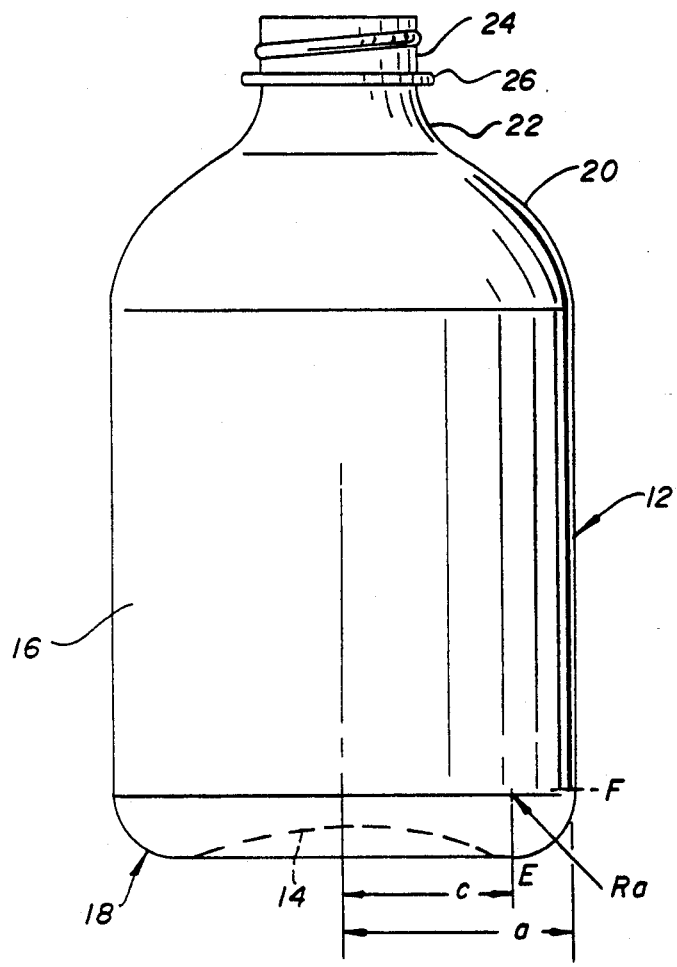
FIG. 1 is a side elevational view of a container formed in accordance with this invention.
Figure 2:
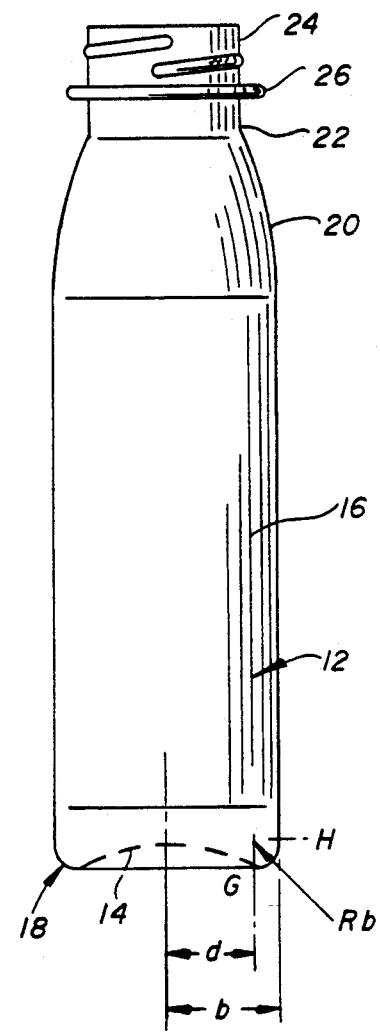
FIG. 2 is an end elevational view of the container of FIG. 1.

Reference is now made specifically to FIGS. 1 and 2 wherein there is illustrated the dimensions a,b and the radii $R_a$, $R_b$ previously discussed. In these Figures there are also illustrated the dimensions c,d and segments EF and GH.

Figure 5:
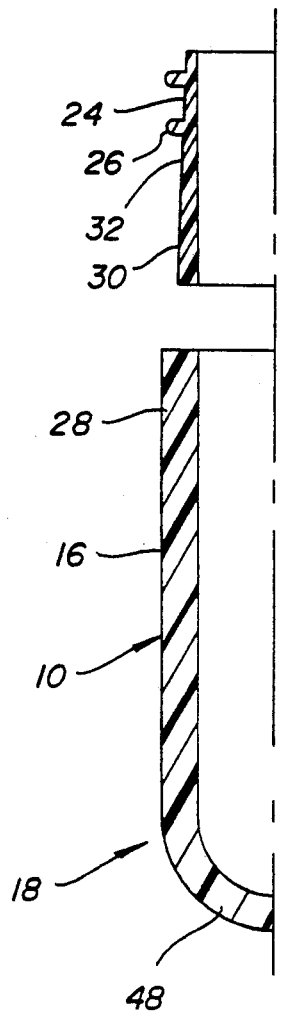
FIG. 5 is a half vertical sectional view of a prior art perform from which the containers of FIGS. 1–4 have been previously formed.

The radial distance c of the segment EF is much greater than that of the radial distance d corresponding to segment GH. Due to the differences in the radial distance and due to the oblong or oval cross sectional of the blow cavity, the wall thickness reduction ratio of segment EF is much greater than that of segment GH. If a conventional preform such as the preform 10 of FIG. 5 having a constant wall thickness and hemispherical closed end, is used, the wall thickness of segment GH would be much greater than the wall thickness of segment EF. The excess material of segment GH leads to problems such as a partially formed section, loss of shape due to post mold shrinkage, non-flat seating surfaces, and lower impact strength. At the other extreme, the lack of material in segment EF could lead to stress whitening, pin holes, partially formed corner, lower impact strength and non-flat seating surface.

The foregoing is more specifically illustrated in FIGS. 6–8 wherein the preform 10 has on lower portions thereof lines indicating relative parts of the preform. Line O is at the center of the hemispherical bottom, which hemispherical bottom extends from O to A. Thereafter, the preform 10 is substantially cylindrical, having a slight interior and exterior taper with the portion A-D forming an upper part of a base forming of the preform 10. Lines B and C correspond to lines found on a preform which is the subject of this invention.

With reference to the prior art showing of FIGS. 7 and 8, which show the base construction of the container 12 formed from the preform 10, it will be seen that in the transverse section of FIG. 8 the preform section OA forms a major part of the bottom 14 while the preform part AB forms the remainder of the bottom and substantially all of the curved part corresponding to the segment GH. The material of part BC of the preform 10 completes the base of the container 12 in the transverse direction with the part CD forming a lower part of the body wall 16 of the container 12. On the other hand, in the relatively wide longitudinal section of FIG. 7, the bottom 14 is is formed from the material of the part O-C of the preform while the material of preform part CD forms the radius or curve corresponding to the segment EF of FIG. 1. This completes the container base, generally identified by the numeral 18. It is to be noted that the point $D_1$ is much higher or axially above the point $D_2$.

Reference is made once again to FIGS. 1 and 2 wherein it will be seen that the container 12 further includes an upper shoulder portion 20 which terminates in a generally cylindrical part 22 above which is a preformed neck finish 24 including a capping flange 26. It will be seen from FIG. 5 that the preform 10 includes a cylindrical part 16 which extends down to the base 18. The clyindrical part 16 also defines a body forming portion 28 which terminates in an upper tapered wall thickness shoulder forming portion 30. Above the tapered shoulder forming portion 30 there is a cylindrical part 32 from which the cylindrical part 22 is formed. Finally, the preform 18 includes an upper neck finish 24 and a capping flange 26 which remains unchanged in the construction of the container 12.

Figure 3:
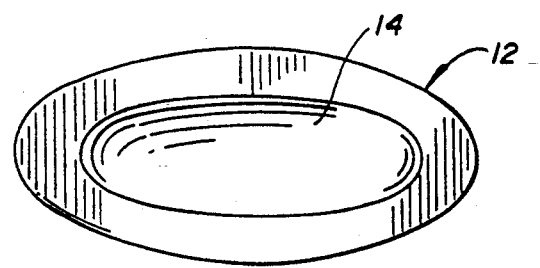
FIG. 3 is a bottom plan view of the container of FIG. 1.
Figure 4:
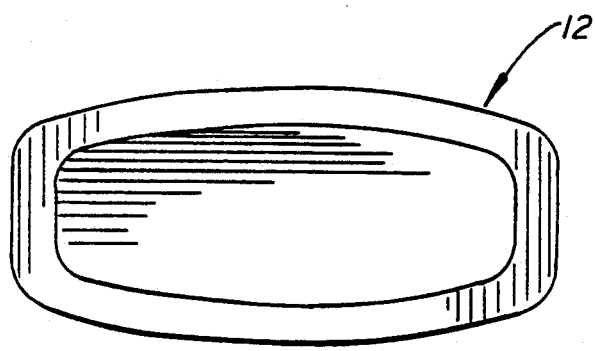
FIG. 4 is a bottom plan view of a container similar to that of FIG. 1 but wherein the cross section is oblong as opposed to oval.

In FIG. 3 it is shown that the container 12 may be of an oval cross section while in FIG. 4 it shows that the container 12 may be of an oblong cross section. Basically there is the same distribution of material for the preform in both an oval base construction and an oblong base construction.

Figure 9:
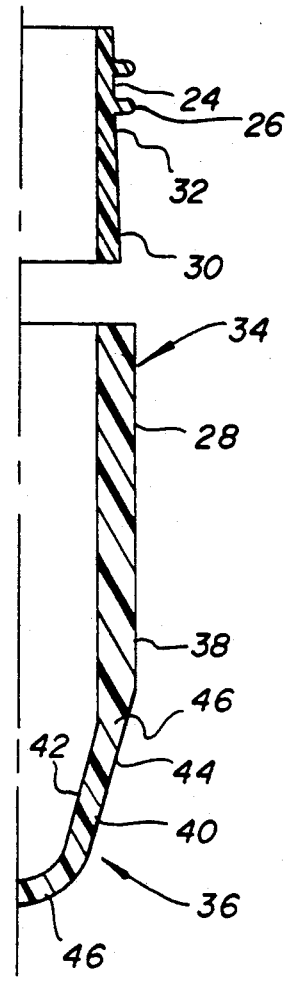
FIG. 9 is a half vertical sectional view with parts broken away of a preform formed in accordance with this invention for forming a container of FIGS. 1–4.

Most specifically, in accordance with this invention, the container 12 may be stretch blow molded from a preform generally identified by the numeral 34 and is shown in FIG. 9. The upper part of the preform 34 is identical with the preform 10 including an injection molded neck finish 24 and capping flange 26. The preform 34 will also have the cylindrical part 32 and the tapered shoulder forming portion 30. Additionally, the preform 34 will include the body forming portion 28. It is only in the base forming portion of the preform 34 that the preform 34 differs from the preform 10.

The preform 34 includes a base forming portion generally identified by the numeral 36. The base forming portion 36 includes an upper uniform wall thickness generally cylindrical part 38 which forms a direct continuation of the container body forming portion 28. Immediately below the part 38, the base forming portion 36 tapers radially inwardly in section to form a frusto conical part 40. The frusto conical part 40, in section, includes a generally straight line inner surface 42 and a generally straight line outer surface 44 which are generally parallel so that the part 40 is of a generally uniform thickness. However, it is to be noted that the surface 44 extends above the surface 42 so as to provide a tapered part 46.

The base construction concludes in a small diameter hemispherical bottom part 46 which is of a lesser thickness than the hemispherical bottom part 48 of the preform 10.

Reference is now made to FIG. 10 wherein there is schematically illustrated the lower part of the preform 34. Further, the container base forming portion 36 has been divided into segments by the letters O, A, B, C and D. These segments match like identified segments of the preform 10.

Referring now to FIGS. 11 and 12, it will be seen that distribution of the various segments OA, AB, BC, and CD in containers 12A formed from the preform 34 will be substantially the same as that formed in a container, such as the container 12, from the preform 10. However, it is to be understood that the wall thickness of the base construction 50 of the container 12A will be different from that of the base construction 18 in view of the thinning down of the bottom part of the container base forming portion 36.

In FIG. 11, the container 12A is illustrated as being defined by a cavity 52 of a stretch blow mold 54 and the preform 34 having been axially stretched by way of a stretch rod 56.

From the foregoing, it will be seen that when one utilizes the preform 34 in conjunction with a stretch blow mold, such as the blow mold 54 specifically configurated to form the container 12, the result is a container 12A with a modified base construction having the proper amount of plastic material from the preform 34 to form the various parts of the base construction 50. In forming the container 12A, the usual stretch blow molding steps are followed.

Although only a preferred form of preform and the method of utilizing the preform have been specifically illustrated and described herein, it is to be understood that minor variations may be made in the preform and the method of forming a container from the preform therefrom without departing from the spirit and scope of the invention as defined by the appended claims.

I claim:

1. A preform for a container having an oval or oblong base, the base having a central bottom and a lowermost seating surface which includes a pair of side seating surfaces defined by a minor axis of the container and a pair of end seating surfaces defined by a major axis of the container, the preform comprising:

an upper neck finish, a middle body forming portion, and a lower base forming portion, the base forming portion comprising in series from bottom to top;

a substantially hemispherical bottom part for forming the central bottom of the container, a frusto conical part having substantially parallel and straight line inner and outer surfaces and being of a first substantially uniform thickness for forming the side seating surfaces of the container base, a tapered part at the upper end of the frusto conical part which varies in thickness from bottom to top from the first thickness to a second thickness greater than the first thickness, and an upper substantially cylindrical part of the second substantially uniform thickness for forming the end seating surfaces of the container base.

2. The perform of claim 1, wherein the outer substantially straight line surface extends into the tapered part.

3. The perform of claim 2, wherein the cylindrical part has in cross-section inner and outer substantially straight line surfaces and wherein the inner surface extends into the tapered part.

4. The preform of claim 1, wherein the hemispherical bottom part has a thickness no greater than the first thickness.

5. The preform of claim 1, wherein the cylindrical part has inner and outer surfaces coextensive with inner and outer surfaces of the body forming portion.

* * * * *

UNITED STATES PATENT AND TRADEMARK OFFICE
CERTIFICATE OF CORRECTION

PATENT NO. : 5,158,817
DATED : October 27, 1992
INVENTOR(S) : S. Krishnakumar

It is certified that error appears in the above-indentified patent and that said Letters Patent is hereby corrected as shown below:

Col. 1, line 52 - delete "view" and substitute -- views --.

Col. 2, line 31 - delete "sectional" and substitute -- section --.

Signed and Sealed this

First Day of February, 1994

Attest:

BRUCE LEHMAN

Attesting Officer     Commissioner of Patents and Trademarks